United States Patent [19]
Yamada et al.

[11] Patent Number: 4,848,846
[45] Date of Patent: Jul. 18, 1989

[54] PORTABLE POWER TOOL

[75] Inventors: Sakuji Yamada, Kobe, Japan; Akio Tsunemitsu, deceased, late of Kobe, Japan, Takao Tsunemitsu, administrator

[73] Assignee: Yamada Machinery Industrial Co., Ltd., Kobe, Japan

[21] Appl. No.: 14,656

[22] Filed: Feb. 13, 1987

[30] Foreign Application Priority Data

| Feb. 15, 1986 | [JP] | Japan | 61-31602 |
| Aug. 25, 1986 | [JP] | Japan | 61-129714[U] |
| Aug. 25, 1986 | [JP] | Japan | 61-129715[U] |

[51] Int. Cl.⁴ .............................................. B26B 7/00
[52] U.S. Cl. .................................. 30/276; 30/296 R; 30/347
[58] Field of Search .................. 30/276, 296 R, 267, 30/347; 74/501.5 R, 502, 523, 526, 527, 529, 531, 532, 475

[56] References Cited

U.S. PATENT DOCUMENTS

| 3,664,102 | 5/1972 | Reber | 56/295 |
| 4,267,744 | 5/1981 | Yamasaki | 74/527 |

FOREIGN PATENT DOCUMENTS 54-146724 11/1979 Japan .
60-113322 4/1985 Japan .
1339691 1/1972 United Kingdom .

Primary Examiner—Douglas D. Watts
Attorney, Agent, or Firm—Birch, Stewart, Kolasch & Birch

[57] ABSTRACT

A portable power tool comprising a support tube connected to an engine by means of an intervening clutch casing, a slider tube slidably fitted to the support tube and spring-biased forward relative to the support tube, a connecting rod connected to a front end of the slider tube and pivotally supporting a cutter holder, a rotary cutter rotatably supported by the holder, a flexible shaft for transmitting a drive force of the engine to the cutter for rotation, a lever mounted on a rear portion of the slider tube, and a wire extending rearward from the lever for connection to the clutch casing, whereby when the lever is pivoted to slide the slider tube relative to the support tube, the holder is pivotally moved to change the orientation of the cutter.

14 Claims, 11 Drawing Sheets

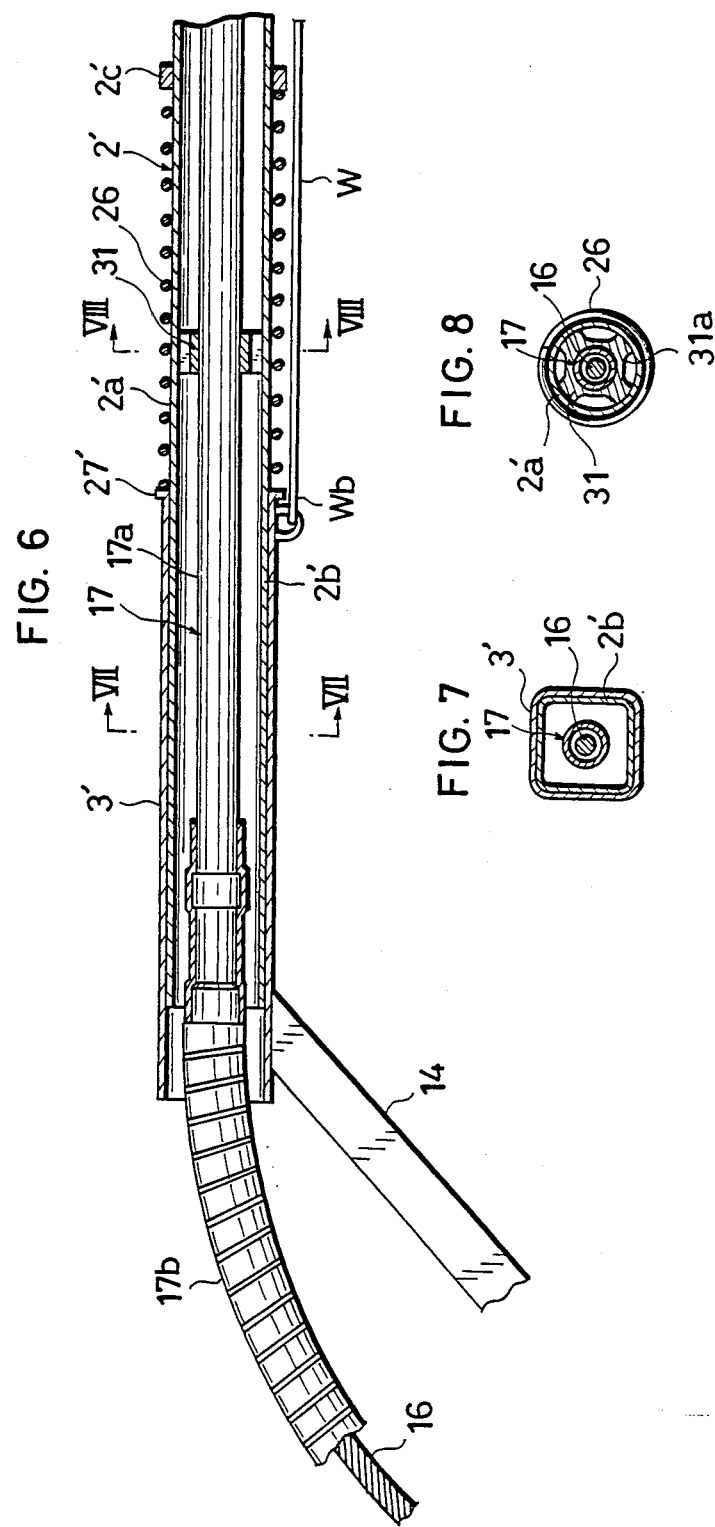

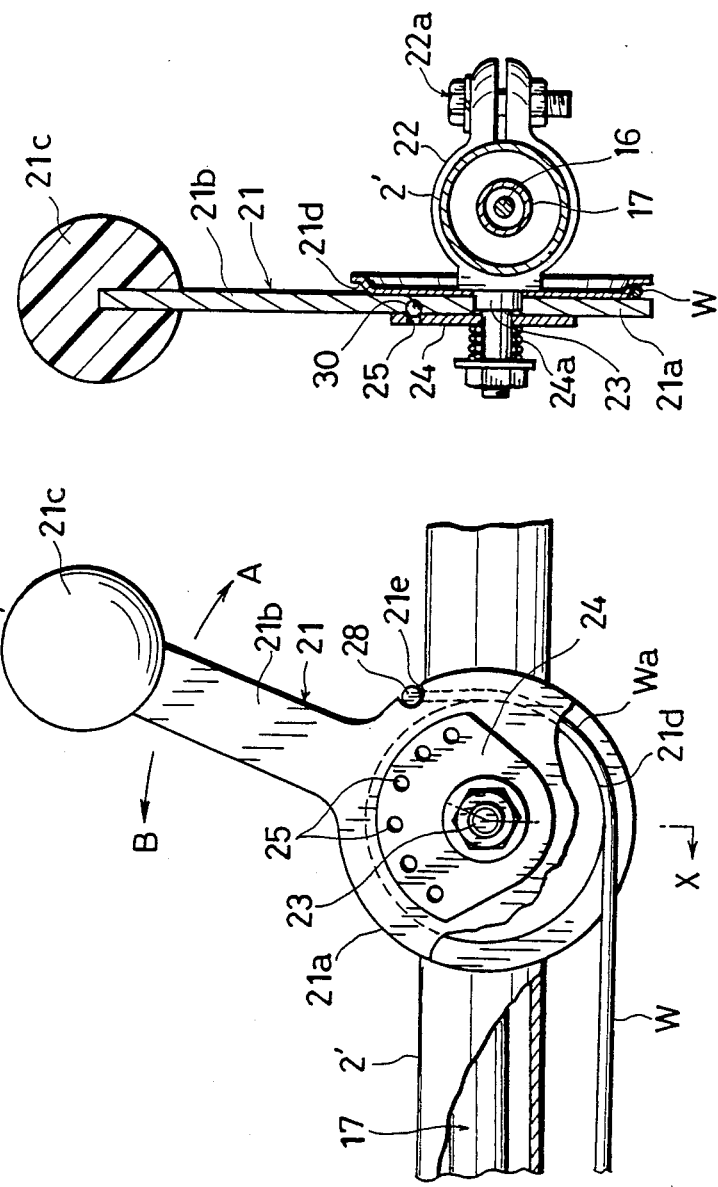

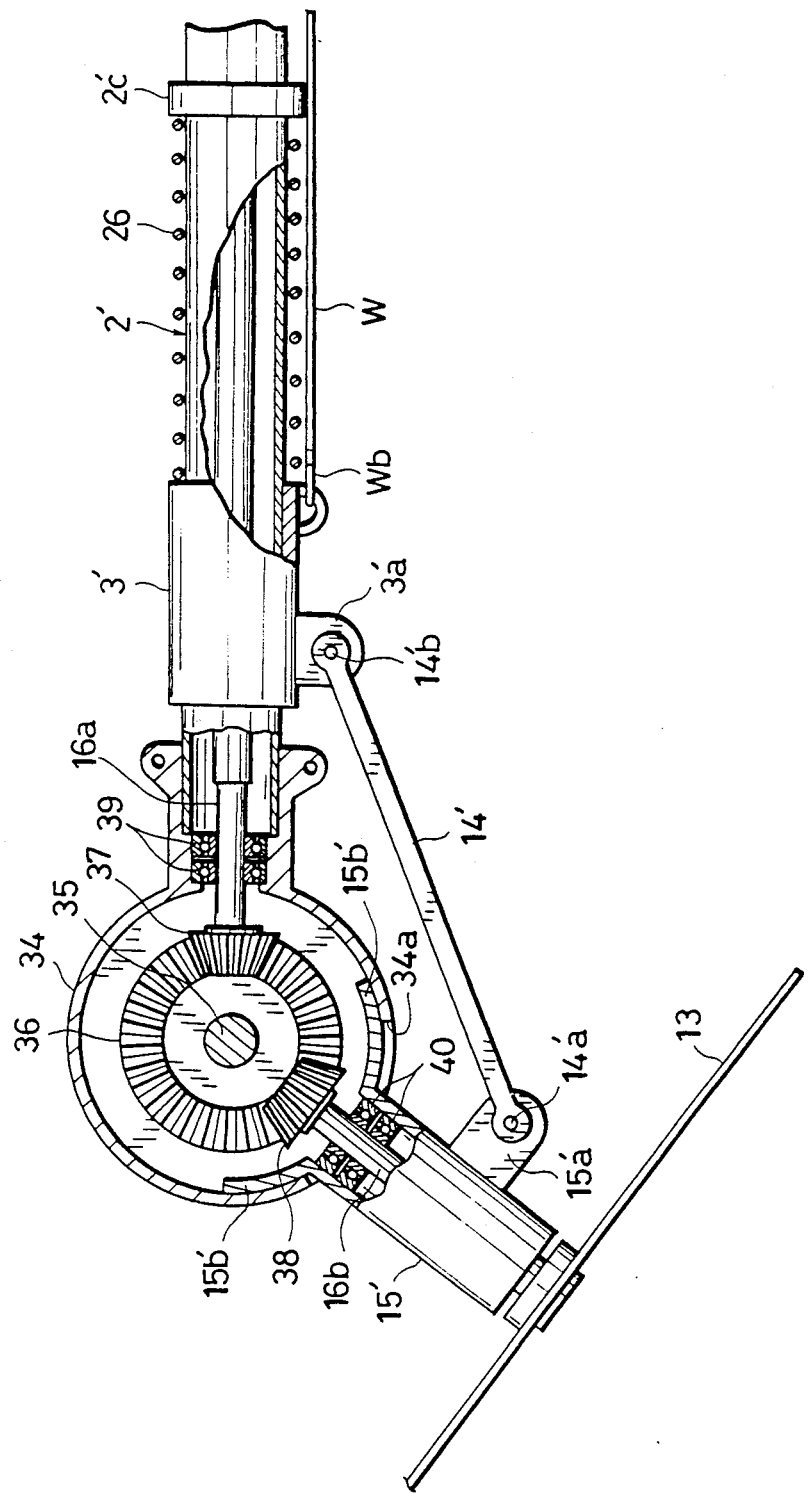

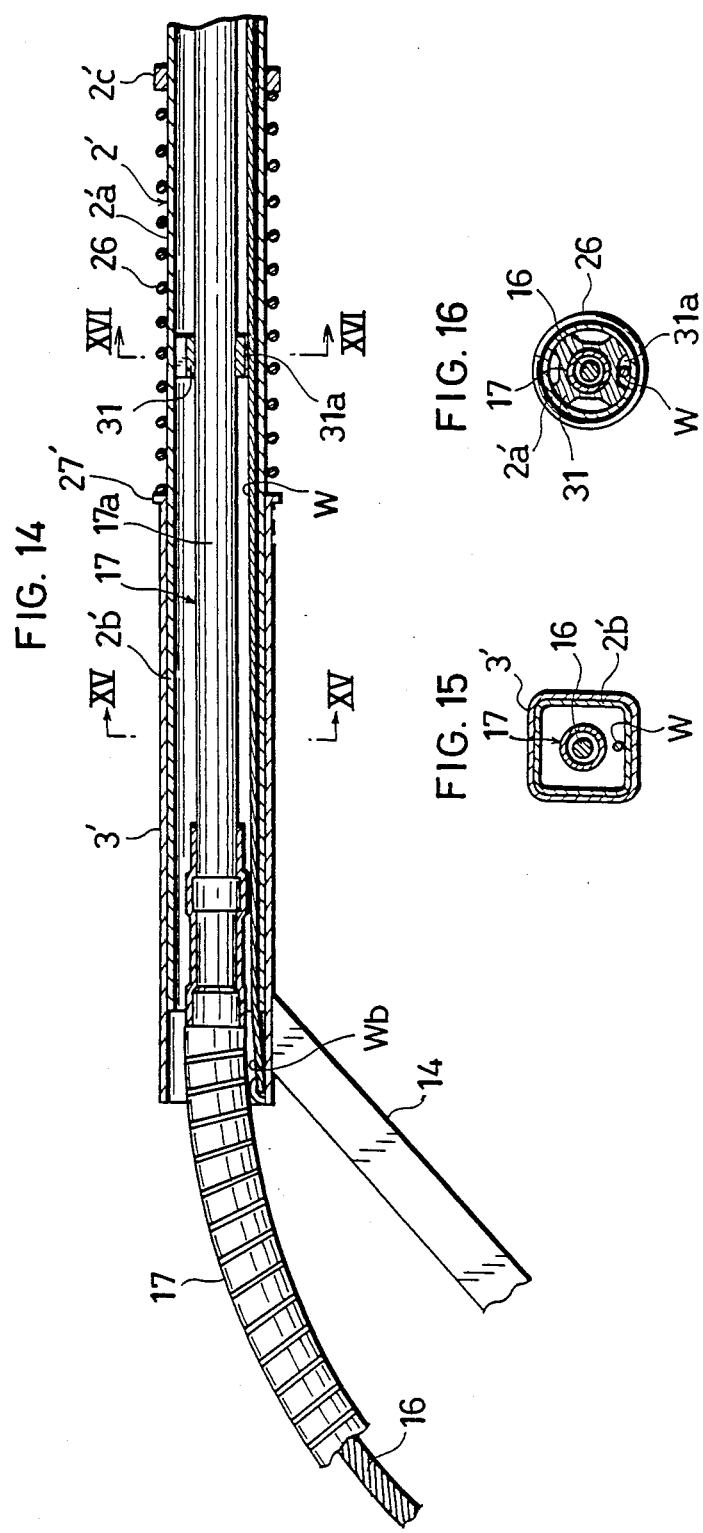

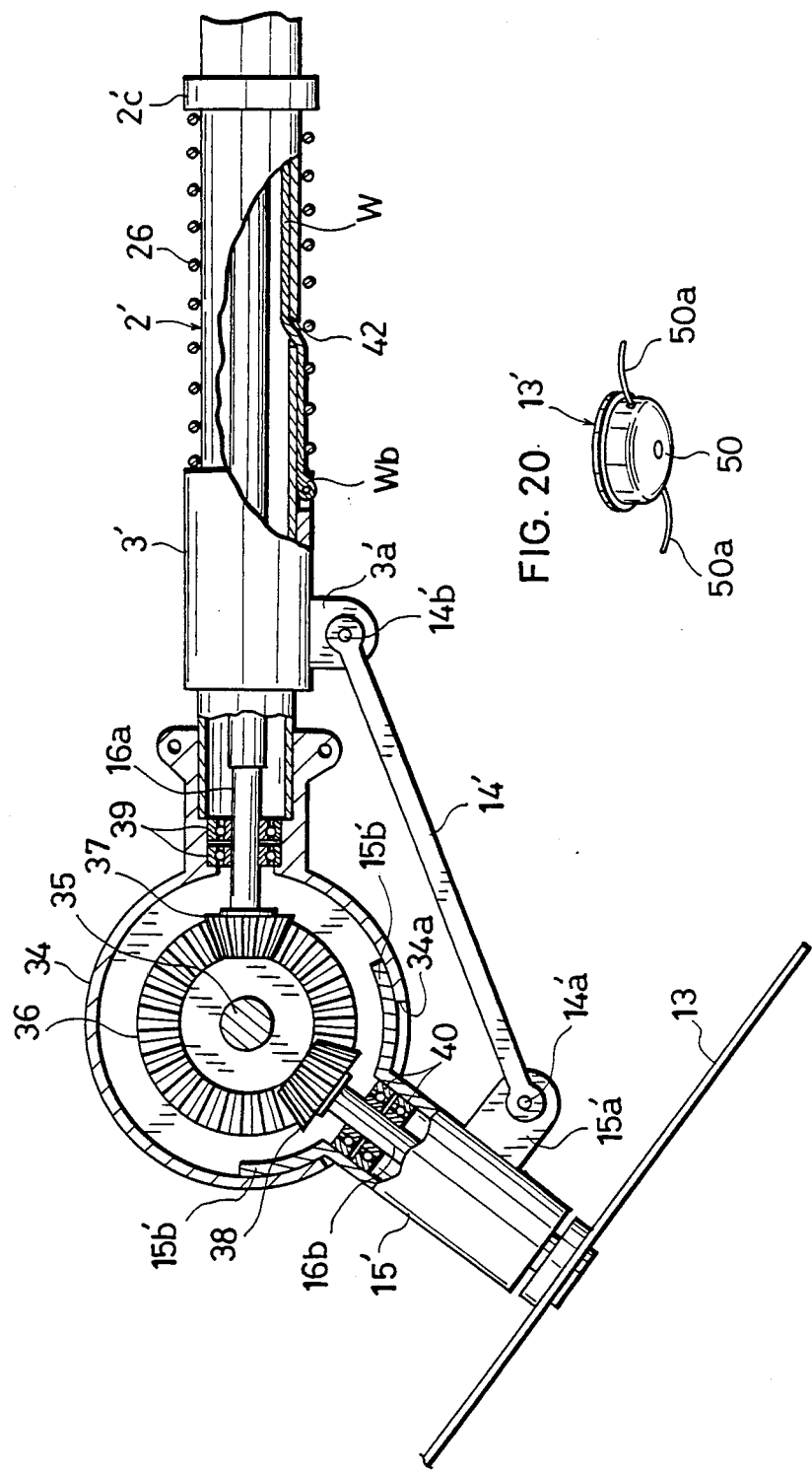

PORTABLE POWER TOOL

BACKGROUND OF THE INVENTION

1. Field of the Invention

This invention relates to a portable power tool of the type which comprises an elongate tubular body supporting at a front end thereof a rotary cutter driven by an engine for mowing, and more particularly to such power tool which is improved to provide excellent operability.

2. Description of the Prior Art

As is well known, a typical portable power tool comprises an elongate tubular body connected at its rear end to an engine and supporting at its front end a rotary cutter at a fixed angle of e.g. 30 degrees relative to the tubular body The cutter is connected to the engine via a transmission shaft extending all the way through the tubular body.

In use of the power tool which is suspendingly shouldered by an operator, the tubular body is turned about its longitudinal axis by operating a handle provided on the tubular body, so that the cutter is altered in orientation to keep parallel to the slope and undulations of ground surface to thereby conduct uniform mowing. However, such operation for orientation change not only proves unsatisfactory for steep or severely undulating ground but also requires the operator to take an unnatural posture.

In view of the above drawback, Japanese Utility Model Publication No. 60-13322 (Published: Apr. 27, 1985; Application No.: 55-26838; Applicant: Yamada Machinery Industrial Co., Ltd.; Inventor: Sakuji Yamada) discloses a portable power tool which comprises a support tube fixed to an engine, and a slider tube axially slidably fitted in the support tube. The support tube is provided with a locking device consisting of a threaded shank with a gripping head, so that the slider tube is locked and unlocked relative to the support tube when the shank is tightened or loosened, respectively.

The slider tube is provided at an intermediate position thereof with a handle for facilitating axial movement of the slider tube. At a front portion of the slider tube is supported a connecting rod or prop bar which extends obliquely downward and forward and which is pivotally connected to a holder for a rotary cutter by means of a pin perpendicular to the longitudinal axis of the support tube and to the rotary axis of the cutter.

A flexible transmission shaft together with a flexible guide sheath extends through and out of the support tube and the slider tube to connect the engine to the cutter for rotation. Since the length of the guide sheath does not change, axial sliding movement of the slider tube relative to the support tube results in compression or tension of the guide sheath, causing the holder to pivot about the pin to vary orientation of the cutter.

The above described power tool, however, has a disadvantage that alteration in the orientation of the cutter requires at least three consecutive steps which include (1) loosening the threaded shank, (2) axially moving the slider tube relative to the support tube, and (3) tightening the threaded shank. Further, since the handle mounted on the slider tube has no expedient for reducing the force required to axially move the slider tube relative to the support tube, manipulation of the power tool is very laborious for the operator.

SUMMARY OF THE INVENTION

It is, therefore, an object of the present invention to provide a portable power tool which provides improved operability by facilitating alteration of cutter orientation.

According to the present invention, there is provided a power tool comprising: a portable drive source; a support tube connected to the drive source; a slider tube axially slidably fitted to the support tube; a cutter holder rotatably supporting a rotary cutter; holder support means for supporting the cutter holder so that the cutter holder is pivotable about a pivotal axis which is substantially perpendicular to a longitudinal axis of the support tube and to a rotary axis of the cutter; the holder support means including a connecting rod connected at one end to the slider tube and pivoted at the other end to the cutter holder to convert axial movement of the slider tube into pivotal movement of the cutter holder; drive transmission means which extends through and out of the support tube and the slider tube to connect the drive source to the cutter for rotation while allowing pivotal movement of the cutter holder; a pivotal lever mounted to one of the support tube and the slider tube; means for converting pivotal movement of the lever into axial movement of the slider tube; and the lever being frictionally holdable at least at predetermined angular positions to substantially lock the slider tube relative to the support tube.

Other objects, features and advantages of the present invention will become apparent from the following detailed description given with reference to the accompanying drawings.

BRIEF DESCRIPTION OF THE DRAWINGS

In the accompanying drawings:

FIG. 6 is an enlarged fragmentary side view, partly broken away, showing a front portion of the second power tool;

FIG. 7 is a section taken along lines VII—VII in FIG. 6;

FIG. 8 is a section taken along lines VIII—VIII in FIG. 6;

FIG. 9 is an enlarged fragmentary side view, partly broken away, showing a lever together with its associated parts;

FIG. 10 is a section taken along lines X—X in FIG. 9;

FIG. 11 is a view, in traverse section, showing a preferred structure of a wire;

FIG. 12 is a side elevation, partly broken away, showing a principal portion of a third power tool embodying the invention;

FIG. 14 is a view similar to FIG. 6 showing a front portion of the fourth power tool;

FIG. 15 is a section taken along lines XV—XV in FIG. 14;

FIG. 16 is a section taken along lines XVI—XVI in FIG. 14;

FIG. 19 is a view similar to FIG. 12 but showing a fifth power tool embodying the invention; and FIG. 20 is a perspective view showing an example of cord-type cutter.

DESCRIPTION OF THE PREFERRED EMBODIMENTS

Figure 1:
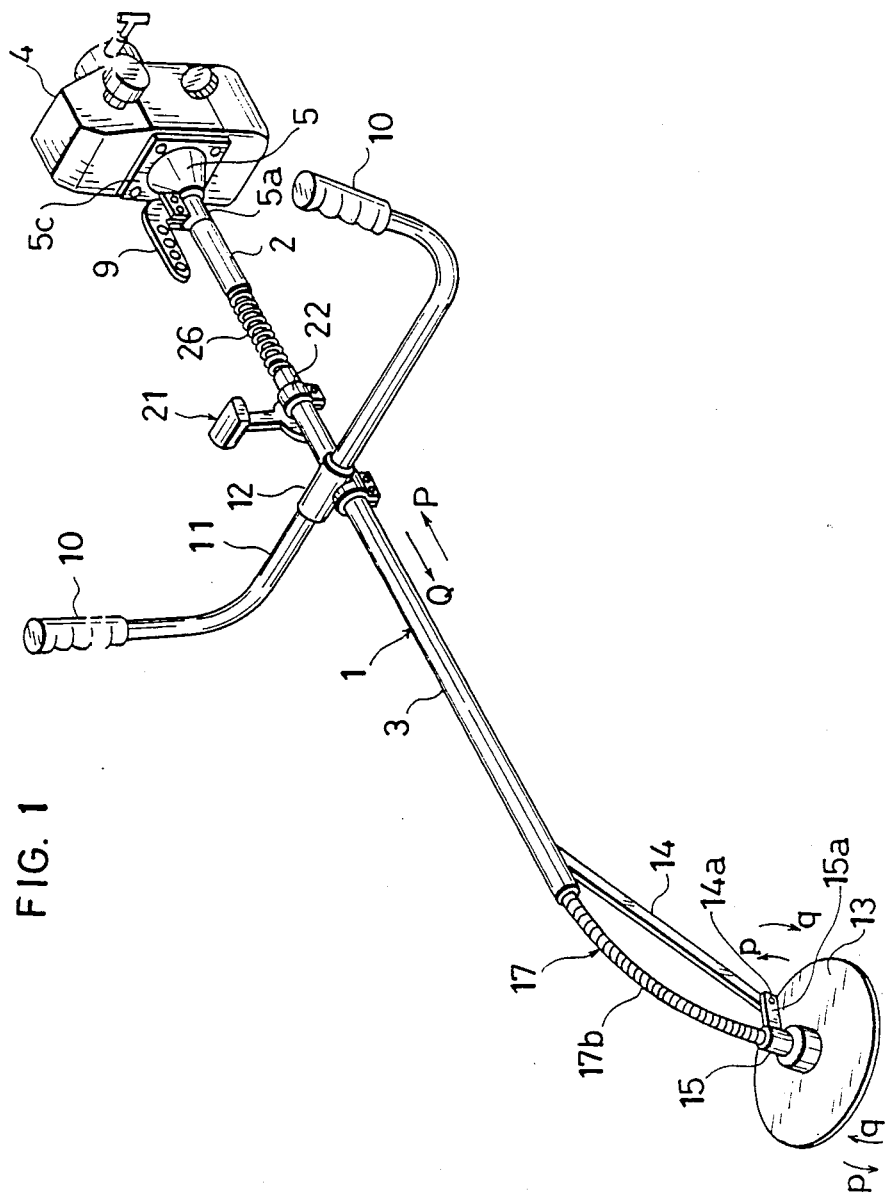
FIG. 1 is an overall perspective view illustrating a first portable power tool (first embodiment) according to the invention.

Throughout the accompanying drawings, identical or similar parts are referred to by the same reference numerals and characters.

Referring now to FIGS. 1 to 4 of the accompanying drawings, a portable power tool generally represented by reference numeral 1 comprises a rigid support tube 2 mounted to an engine 4, and a rigid slider tube 3 supported by the support tube 2 in alignment therewith.

Figure 2:
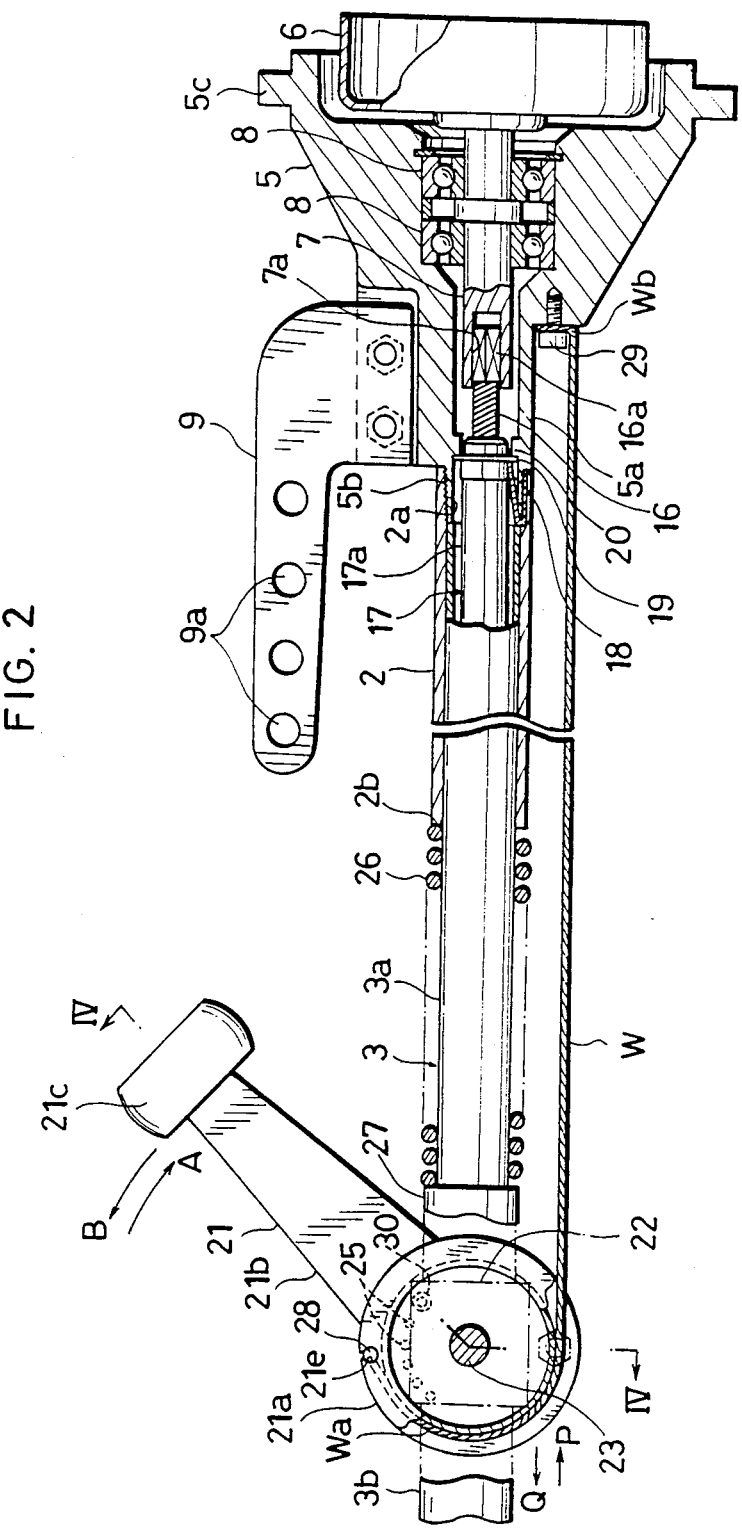
FIG. 2 is an enlarged fragmentary side view partly broken away, showing a rear portion of the same power tool.

The support tube 2 is rigidly mounted to the engine 4 by means of a frust-conical hollow clutch casing 5. More particularly, the casing 5 has a cylindrical front portion 5a formed with an externally threaded end 5b to which is screwed an internally threaded end 2a of the support tube 2, as illustrated in FIG. 2. The casing further has an end flange 5c which is fixedly bolted or welded to the engine 4. Thus, the engine 4 is substantially integral with the support tube 2.

Within the interior space of the clutch casing 5 is arranged an output shaft 7 connected to a clutch drum 6 as rotatably supported by a pair of axially spaced bearings 8. The output shaft 7 has a front axial bore 7a which is polygonal in cross section.

A retainer 9 having a plurality of engaging holes 9a is fixedly bolted to the cylindrical portion 5a of the clutch casing 5. A selected one of the engaging holes 9a is used to engage with a fixing device (not shown) connected to a shoulder belt (not shown), so that the engine 4 is suspendingly shouldered by an operator by means of the belt.

The slider tube 3 is diametrically reduced at its intermediate portion to provide a smaller diameter portion 3a and a larger diameter portion 3b with an annular shoulder 27 formed therebetween. The smaller diameter portion 3a is rotatably and axially slidably fitted in the support tube 2 from the other or non-threaded end 2b thereof.

A compression coil spring 26 is interposed between the annular step 27 and the non-threaded end 2b of the support tube 2 on the smaller diameter portion 3a of the slider tube 3. Thus, the slider tube 3 is always urged forward relative to the support tube 2.

A U-shaped handle 11 having a pair of upwardly directed end grips 10 is centrally connected, in intersecting relation, to an intermediate position of the larger diameter portion 3b of the slider tube 3 by means of a clamp fixer 12, so that the operator can rotate the slider tube 3 about its longitudinal axis by operating the handle 11.

Fixed to the front end of the slider tube larger diameter portion 3b as by welding is a rigid connecting rod or prop bar 14 which extends obliquely downward and forward. The lower or forward end of the prop bar 14 is pivotally connected to a holder bracket 15a of a cutter holder 15 by means of a pin 14a extending perpendicularly to the longitudinal axis of the slider tube 3 and of the support tube 2.

The cutter holder 15 rotatably supports a rotary cutter 13 which, according to the illustrated example, is in the form of a disc-like blade and whose rotary axis is perpendicular to the pin 14a. Since the holder 15 is pivotable on the pin 14a, the discal blade 13 is also pivotable on the pin 14a to change its orientation.

The rotation of the output shaft 7 (see FIG. 2) is transmitted to the cutter 13 via a flexible transmission shaft 16 (FIGS. 2 to 4) which extends through the support tube 2 and the slider tube 3. More specifically, the flexible shaft 16 is provided at its one end with an end member 16a which is polygonal in cross section for co-rotatable engagement into the correspondingly polygonal axial bore 7a of the output shaft 7 while the other end (not shown) of the flexible shaft projects beyond the slider tube 3 for connection to the cutter 13.

In order to ensure optimum drive force transmission and to protect the flexible shaft 16, substantially the entire length thereof is enclosed in a guide sheath 17 which, according the illustrated example, comprises a rigid tube portion 17a which is accommodated within the space defined by the support tube 2 and the slider tube 3, and a flexible tube portion 17b which projects beyond the slider tube 3.

The rigid tube portion 17a of the sheath 17 is provided at its rear end with an annular outward flange 19 which is held engaged with an annular inward projection 20 by an engaging member 18 fixedly retained at the connection between the internally threaded end 2a of the support tube 2 and the externally threaded end 5b of the clutch casing 5. Thus, the rigid tube portion 17a of the guide sheath 17 is prevented from axial movement relative to the support tube 2.

The other end of the rigid tube portion 17a is connected to one end of the flexible tube portion 17b (FIG. 3), whereas the other end of the latter is connected to the cutter holder 15 (FIG. 1).

According to the present invention, the slider tube 3 is axially moved relative to the support tube 2 by a specific lever arrangement described hereinbelow.

Figure 4:
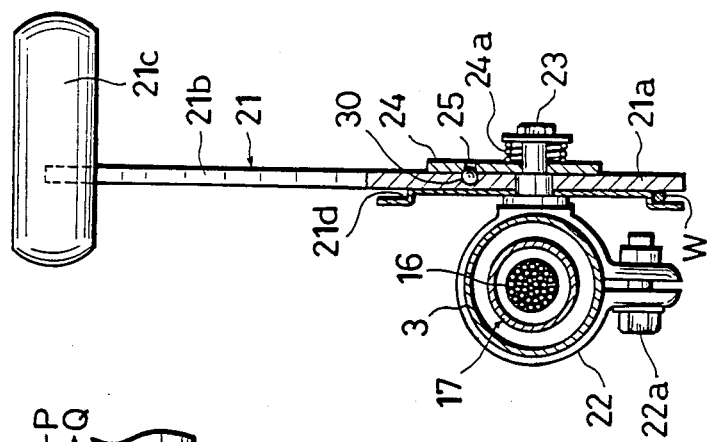
FIG. 4 is a section taken along lines IV—IV in FIG. 2.
Figure 3:
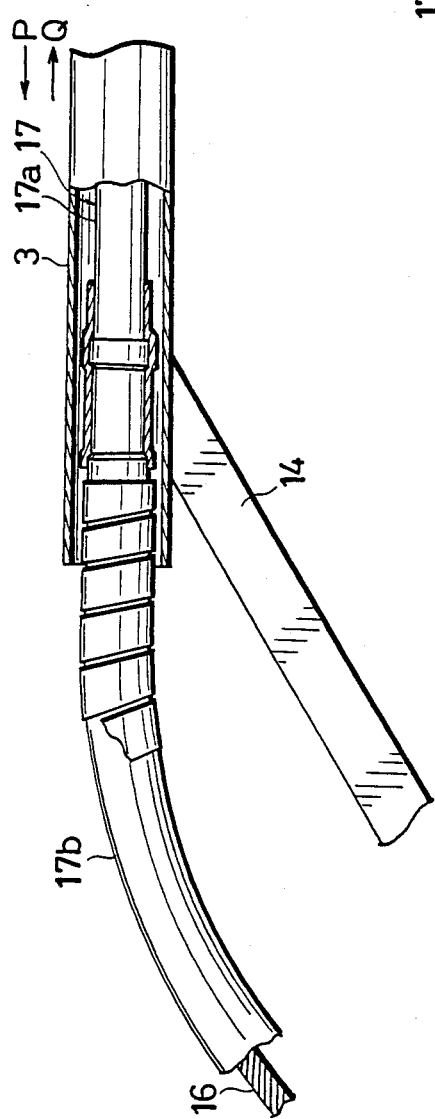
FIG. 3 is an enlarged fragmentary side view, partly broken away, showing a front portion of the same power tool.
Figure 5:
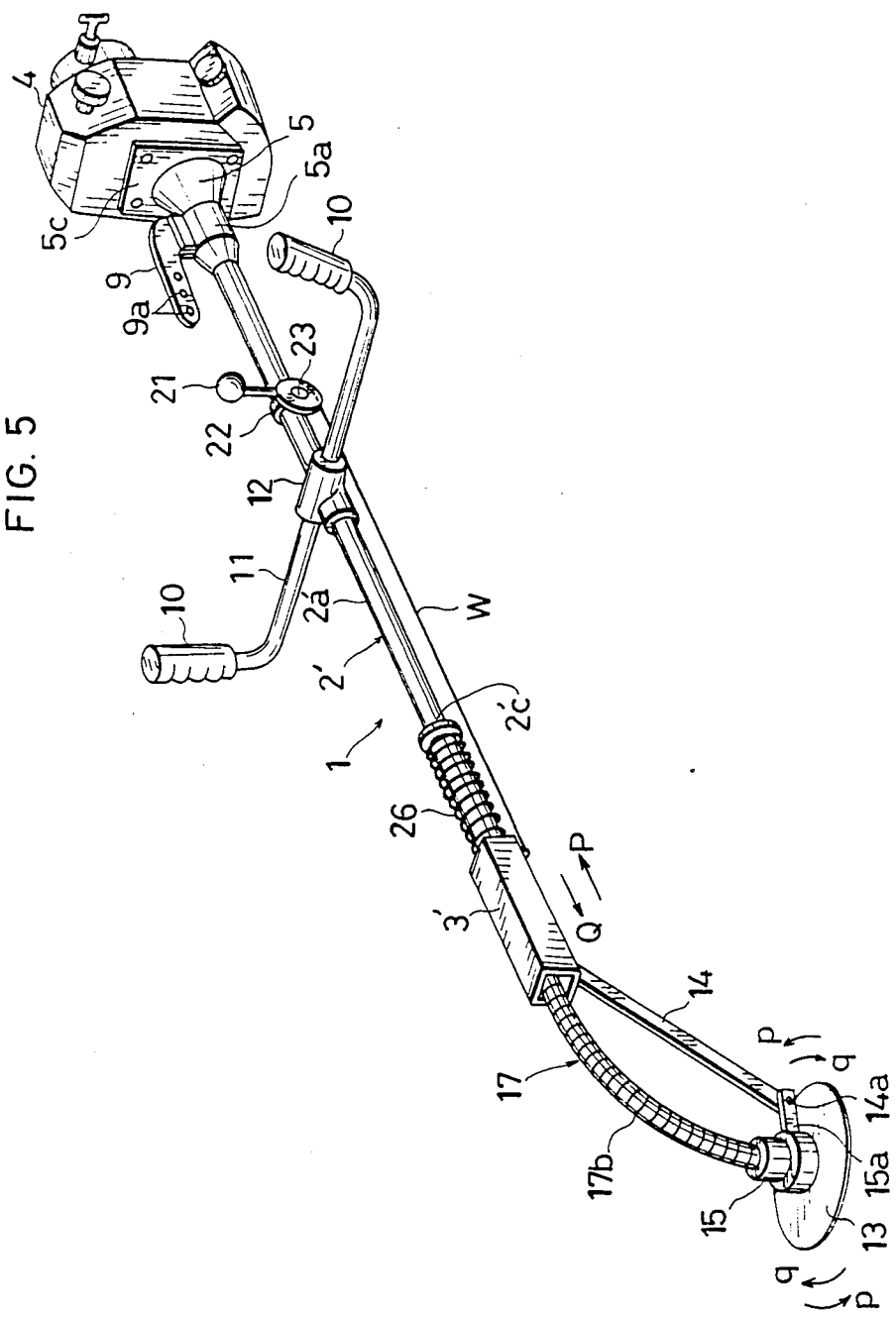
FIG. 5 is a view similar to FIG. 1 but illustrating the entirety of a second portable power tool embodying the invention.
Figure 13:
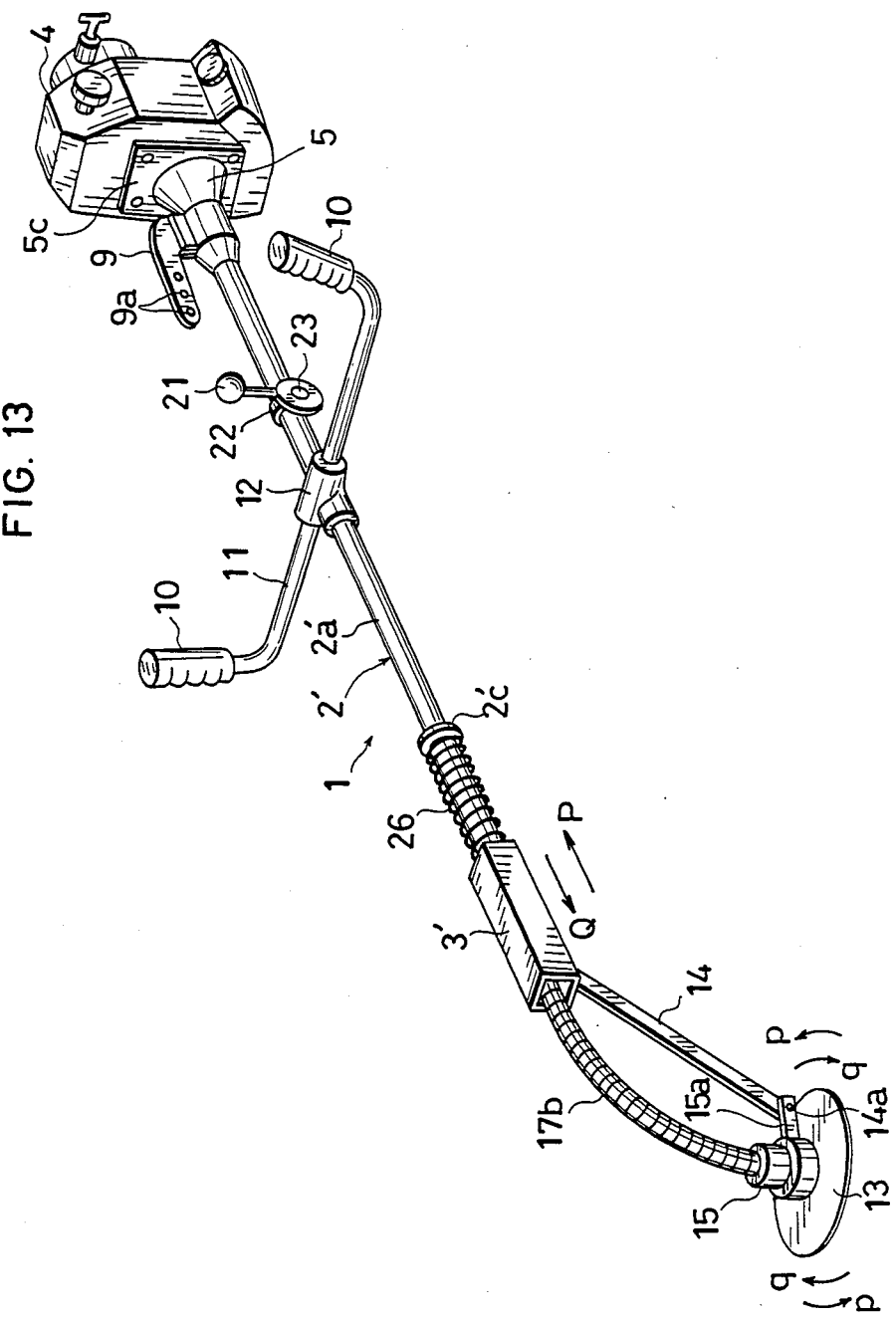
FIG. 13 is a view similar to FIG. 5 but showing the entirety of a fourth power tool embodying the invention.
Figure 18:
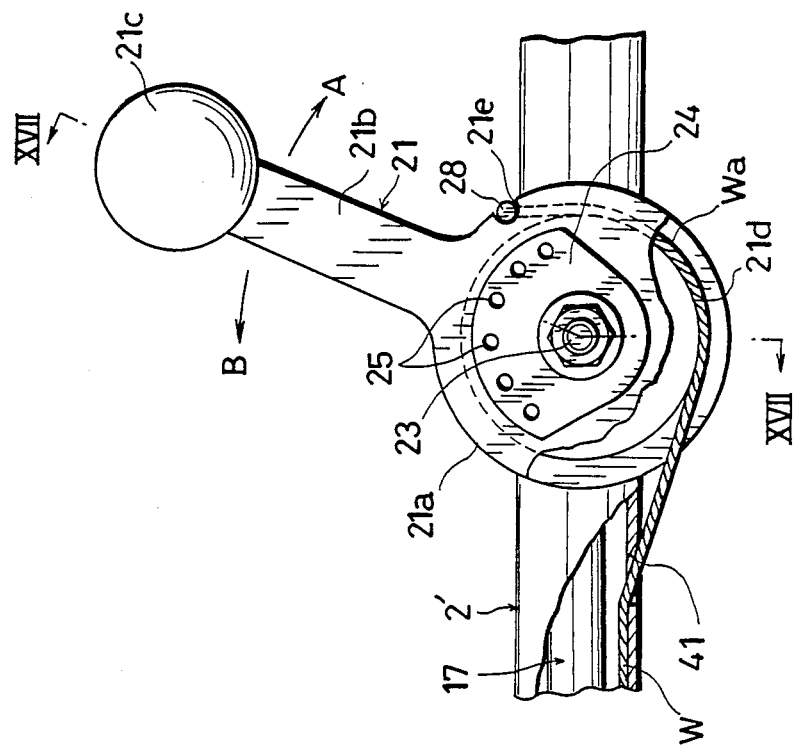
FIG. 18 is a view similar to FIG. 9 but showing a lever for the fourth power tool.
Figure 17:
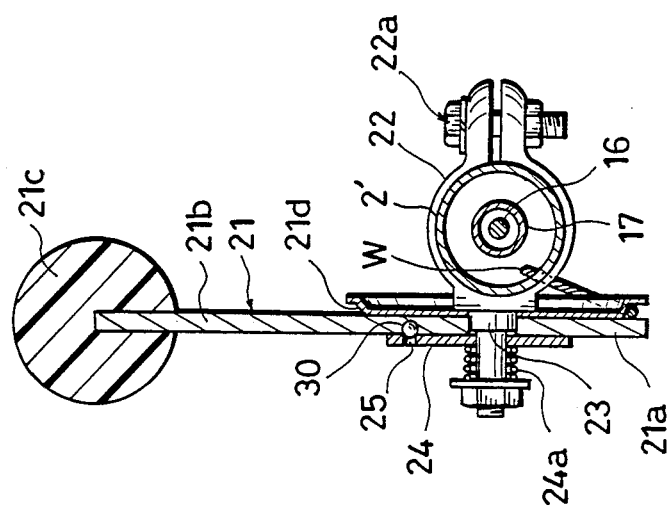
FIG. 17 is a section taken along lines XVII—XVII in FIG. 18.

As shown in FIGS. 2 and 4, a lever 21 having a circular base portion 21a, an arm portion 21b and an enlarged grip portion 21c is pivotally supported on a lever shaft 23 which is fixedly mounted on the larger diameter portion 3b of the slider tube 3 at a position thereof adjacent to the annular shoulder 27 by means of a clamp band tightened by a suitable clamping device 22a such as a bolt and nut. On one side of the lever base portion 21a is provided an annular winding groove 21d, whereas a click plate 24 is arranged on the other side of the lever base portion 21a.

The pivotal movement of the lever 21 is converted to relative axial movement between the support tube 2 and the slider tube 3 via a wire W. One end Wa of the wire is received in the annular winding groove 21d of the lever 21 and provided at its extremity with an end nipple 28 which engages in a peripheral cutout 21e formed at a suitable location on the circumference of the lever base portion 21a. The other end Wb of the wire is directed rearward and fixed to a suitable portion of the clutch casing 5 by a screw 29. The click plate 24 is always urged toward the lever base portion 21a by a coil spring 24a. Further, the click plate is formed with an arcuate row of angularly spaced clicking holes 25 into a selected one of which is engageable a steel ball 30 mounted on the lever base portion 21a, so that the lever 21 can be pivoted stepwise and held at each selected angular position with a relatively large retaining force. The number of the clicking holes 25 is optional. In operation of the power tool or mower 1 which is shouldered by an operator, when the lever 21 is pivoted rearward as indicated by an arrow A in FIG. 2, the wire W is wound up into the annular winding groove 21d of the lever base portion 21a to axially move the slider tube 3 rearward into the support tube 2 against the biasing force of the compression spring 26 as indicated by an arrow P. As a result, the prop bar 14 also moves rearward to compress or bend the flexible shaft 16 and guide sheath 17 (flexible portion 17b) which do not change in length, causing the rotary cutter 13 to pivot about the pin 14a in the direction of an arrow P (FIG. 1).

Conversely, when the lever 21 is pivoted forward as indicated by an arrow B, the wire W is paid out from the winding groove 21d, and the slider tube 3 is axially moved forward relative to the support tube 2 by the restoring force of the compression spring 26 as indicated by an arrow Q. This causes an unbending of the guide sheath 17 (together with the flexible shaft 16 inside) to pivot the cutter 13 about the pin 14a in the direction of an arrow Q.

Thus, by pivoting the lever 21 back and forth, it is possible to change the orientation of the rotary cutter 13 in accordance with a particular ground condition, thereby enabling the operator to conduct most effective and efficient mowing operations. Further, since a frictional force produced by engagement of the steel ball 30 with one of the clicking holes 25 is enough to withstand the urging force of the compression spring 26, the lever 21 can be held at each clicked position without requiring manual holding, which means that no separate locking mechanism or operation is called for to prevent the relative axial movement between the support tube 2 and the slider tube 3.

Thanks to the principles of leverage, obviously, the relative axial movement between the slider tube 3 and the support shaft 2 can be achieved more easily by the pivotal movement of the lever 21 than by directly pushing and pulling the slider tube 3.

As described hereinbefore, the slider tube 3 is rotatable about its own axis relative to the support tube 2 by operating the handle 11, thereby causing the rotary cutter 13 to pivot about the longitudinal axis of the slider tube 3. Combined pivotal movement of the rotary cutter 13 about the pin 14a and about the longitudinal axis of the slider tube 3 provides a wide variety of orientations to be assumed by the rotary cutter 13.

The wire W extends rearward from the lever 21 which is inherently located on the rear side of the power tool 1 close to the operator, so that the wire will not be entangled with plants nor damaged by any other obstacles during the mowing operation.

The row of clicking holes 25 illustrated in FIGS. 2 and 4 may be replaced by a similar row of clicking recesses. Likewise, the steel ball 30 may also be replaced by a rounded protrusion on the lever base portion.

The provision of the clicking holes 25 and the steel ball 30 is not necessary when the lever 21 is designed to be pivoted with a constant frictional force which is larger than the urging force of the compression spring 26. Further, the spring 26 becomes unnecessary if the wire W is replaced by a link rod which is pivotally pinned at its respective ends to the lever base portion 21a and the clutch casing 5, because such a link rod is capable of transmitting not only a pulling force but also a pushing force.

The wire W, which is illustrated in FIG. 2 as consisting of a single cable, may be in the form of a double cable comprising an inner cable and an outer guide cable. In this case, the double cable can extend along any path, straight or curved, thereby providing freedom in arrangement of the cable per se as well as of the lever. The double cable further provides another advantage that the guide cable protects the inner cable against rain and dust.

The slider tube 3 is axially slidably and rotatably fitted at its smaller diameter portion 3a in the support tube 2, as illustrated in FIG. 2. However, the slider tube 3 may of course be modified to be axially slidably and rotatably fitted around the support tube 2.

FIGS. 5 to 10 shows another portable power tool of the invention which comprises a considerably elongated rigid support tube 2′ connected to an engine 4 by means of a clutch casing 5 having a front cylindrical portion 5a. The support tube 2′ may be rotatable about its longitudinal axis but not axially slidable relative to the casing front portion 5a.

The support tube 2′ has a cylindrical main portion 2a′ (FIG. 8) and a front portion 2b′ which is rectangular in cross section (FIG. 7). The main portion 2a′ occupies a substantial length of the support tube 2′ and is provided with an annular intermediate flange 2c′.

As opposed to the foregoing embodiment, a handle 11 and a lever 21 are mounted on the main portion 2a′ of the support tube 2′ intermediate the annular flange 2c′ and the clutch casing 5. However, the details of the handle 11 and the lever 21 as well as of their related parts are substantially identical to those of the foregoing embodiment and thus are not described here.

On the front portion 2b′ of the support tube 2′ is axially slidably but non-rotatably fitted a slider tube 3′ of relatively small length which is also rectangular in cross section. The slider tube 3′ is formed at its rear end with an end flange 27′. A compression coil spring 26 is interposed between the end flange 27′ and the annular flange 2c′, so that the slider tube 3′ is always biased forward by the spring 26.

A wire W, whose one end Wa is engaged with the winding groove 21d of the lever 21, extends forward and is connected at the other end Wb to the slider tube 3′. Thus, the slider tube 3′ is controlled in its axial sliding movement by the lever 21 through the wire W.

The modified power tool 1 further includes a retainer 9 with engaging holes 9a, a rotary cutter 13, a prop bar (connecting rod) 14, a pin 14a, a cutter holder 15 with a holder bracket 15a, a flexible shaft 16, and a guide sheath 17, all of which correspond in configuration and function to those parts identified in FIGS. 1 to 4 by the same reference numerals and characters. Indicated at 31 in FIGS. 6 and 8 is a sheath support having a plurality of peripheral cutouts 31a.

The operation of the modified power tool 1 is substantially the same as the foregoing embodiment, except that the rearward pivoting (arrow A in FIG. 9) and forward pivoting (arrow B) of the lever 21 causes forward and rearward axial movements, respectively, of the slider tube 3'.

According to the modification of FIGS. 5 to 10, since the slider tube 3' is relatively short and free from the weight of the handle 11, it can be axially moved with a smaller force than the slider tube 3 (longer and heavier) of the foregoing embodiment.

FIG. 11 shows a preferred structure of a wire which is usable for both of the foregoing embodiments. More particularly, the wire W comprises a multiplicity of stranded metallic monofilaments 32 which are enclosed in a rust preventive coating or covering 33. The covering 33 may be made of heat-shrinkable resin, in which case the covering 33 comes into intimate contact with the stranded filaments inside upon heating.

FIG. 12 illustrates another modification wherein a support tube 2', on which is slidably fitted a slider tube 3', is connected at its front end to a circular gear casing 34. A main bevel gear 36 is rotatably mounted on a gear shaft 35 which extends perpendicularly to the longitudinal axis of the support tube 2' and to the rotary axis of a rotary cutter 13.

The rotary cutter 13 is supported by a tubular cutter holder 15' which is pivotable about the gear shaft 35. More specifically, the cutter holder 15' extends through an opening 34a' of the gear casing 34 but has a pair of arcuate wings 15b' in slidable contact with the inner circumference of the gear casing 34.

A first rigid transmission shaft 16a, which is connected to an unillustrated engine, extends through the support tube 2' and is provided at its front end with a drive bevel gear 37 in mesh with the main gear 36. On the other hand, a second rigid transmission shaft 16b, which is connected at its front end to the rotary cutter 13, extends within the cutter holder 15' and carries at its rear end a driven bevel gear 38 also in mesh with the main gear 36. Thus, the drive force of the engine is transmitted to the second shaft 16b through the first shaft 16a, the drive bevel gear 37, the main bevel gear 36 and the driven bevel gear 38 to rotate the cutter 13 regardless of the pivotal position of the cutter holder 15'. Indicated at 39 and 40 are bearings for the respective shafts.

The slider tube 3a' carries a downwardly directed bracket 3a' pivotally connected to one end of a rigid connecting rod 14' by a pin 14b' while the other end of the rod is pivotally connected to a holder bracket 15a' of the cutter holder 15'. Thus, when the slider tube 3' is axially moved back and forth on the support tube 2' by means of a lever (not shown), a wire W and a compression coil spring 26, the cutter holder 15' is pivoted on the gear shaft 35 to vary the orientation of the cutter 13. It should be understood that the modification of FIG. 12 is otherwise the same as the example illustrated in FIGS. 5 to 10.

FIGS. 13 through 18 illustrate a further modification which is very similar to the embodiment of FIGS. 5 to 10 but differs therefrom only in that the wire W is introduced into the support tube 2' through a hole 41 which is formed in the wall thickness of the support tube adjacent to the lever 21 and which is connected at its forward end to the front end of the slider tube 3'. Such a modification is advantageous in that the wire W not only requires no rust preventive coating but also is free from unexpected contact with plants or hard obstacles during mowing operation.

A still further modification illustrated in FIG. 19 is substantially identical to the example of FIG. 12, the only difference residing in that the wire W, which is once introduced into the support tube 2' in a manner similar to the example of FIGS. 14 to 18, is again brought out of the support tube 2' through a front hole 42 thereof to be connected to the rear end of the slider tube 3'.

The rotary cutter 13, which is illustrated as being in the form of a disc-like blade throughout the embodiments of FIGS. 1 to 19, may be replaced by a cord-type rotary cutter 13' having a cord accommodating casing 50 from which radially extend a pair of nylon cords 50a, as illustrated in FIG. 20. Naturally, the cord-type cutter ensures safety during mowing operations. It is to be noted that such a cord-type cutter is known per se, as disclosed for example in U.S. Pat. No. 3,664,102.

The invention being thus described, it is obvious that the same may be varied in many ways. For instance, the engine 4, which is illustrated as being rigidly connected to the support tube 2 or 2', may be flexibly connected to such support tube by means of a bellow and separately shouldered on an operator's back. Such variations are not to be regarded as a departure from the spirit and scope of the invention, and all such modifications as would be obvious to those skilled in the art are intended to be included within the scope of the following claims.

We claim:

1. A portable power tool connected to said drive source;
    a drive source;
    a support tube connected to said drive source;
    a slider tube axially slidably fitted to said support tube;
    a cutter holder rotatably supporting a rotary cutter;
    holder support means for supporting said cutter holder so that said cutter holder is pivotable about a pivotal axis which is substantially perpendicular to a longitudinal axis of said support tube and to a rotary axis of said cutter, said holder support means including a connecting rod connected at one end of said slider tube and pivoted at the other end to said cutter holder to convert axial movement of said slider tube into pivotal movement of said cutter holder;
    drive transmission means which extends through and out of said support tube and said slider tube to connect said drive source to said cutter for rotation while allowing pivotal movement of said cutter holder;
    a pivotal lever mounted to one of said support tube and said slider tube; and
    means for converting pivotal movement of said lever into axial movement of said slider tube;
    wherein said means for converting comprises a compression coil spring interposed between said support tube and said slider tube for urging said slider tube forward relative to said support tube, and a wire to be wound on said lever by pivotal movement thereof in one direction for causing said slider tube to move rearward relative to said support tube against the urging force of said spring, and said lever being frictionally holdable at least at predetermined angular positions to substantially lock said slider tube relative to said support tube.

2. The power tool as defined in claim 1, wherein said lever has a circular base portion provided on one side thereof with a click plate, said click plate being spring-biased against said base portion and formed with an arcuate row of angularly spaced clicking holes, said base portion further being provided on said one side with a rounded engaging element which engages with a selected one of said clicking holes when said lever is pivoted.

3. The power tool as defined in claim 2, wherein said support tube is rigidly connected to said engine by means of an intervening clutch casing, said slider tube is considerably longer than said support tube and axially slidably fitted at a rear end thereof to said support tube, said lever is mounted on said slider tube at a position adjacent to said support tube and provided on said base portion with an annular winding groove, and said a wire has one end wound in said winding groove and the other end directed rearward for connection to said clutch casing.

4. The power tool as defined in claim 3, wherein said slider tube has a smaller diameter portion and a larger diameter portion with an annular shoulder formed therebetween, said smaller diameter portion is slidably fitted in said support tube, said lever is mounted on said larger diameter portion at a position close to said annular shoulder, and said spring is interposed between said annular shoulder and a front end of said support tube.

5. The power tool as defined in claim 2, wherein said support tube is rigidly connected to said engine by means of an intervening clutch casing and considerably longer than said slider tube, said slider tube is slidably fitted on a front portion of said support tube, said lever is mounted on said support tube at position adjacent to said clutch casing and provided on said base portion with an annular winding groove, and said wire has one end wound in said winding groove and the other end directed forward for connection to said slider tube.

6. The power tool as defined in claim 5, wherein said support tube is provided with an intermediate annular flange adjacent to said slider tube, and said spring is interposed between said annular flange and a rear end of said slider tube.

7. The power tool as defined in claim 5, wherein said wire is introduced into said support tube through a hole formed in the wall thickness of said support tube at a position close to said lever.

8. The power tool as defined in claim 7, wherein said other end of said wire is connected to a front end of said slider tube.

9. The power tool as defined in claim 7, where said other end of said wire is brought outside said support tube through a second hole formed in the wall thickness of said support tube at a position close to said slider tube for connection to a rear end of said slider tube.

10. The power tool as defined in claim 3, wherein said wire comprises a multiplicity of stranded metallic monofilaments enclosed in a rust preventive covering.

11. The power tool as defined in claim 5, wherein said wire comprises a multiplicity of stranded metallic monofilaments enclosed in a rust preventive covering.

12. The power tool as defined in claim 1, wherein said drive transmission means comprises a flexible transmission shaft enclosed in a guide sheath which is also flexible at least in a front exposed portion thereof.

13. The power tool as defined in claim 1, wherein said drive transmission means comprises a first rigid shaft extending within said support tube and provided at a front end thereof with a drive bevel gear, a second rigid shaft extending within said cutter holder and provided at a rear end thereof with a driven bevel gear, and a main bevel gear disposed in mesh with both of said drive and driven bevel gears and rotatably supported on a gear shaft which is perpendicular to said first and second shafts, said connecting rod is pivoted at said one end thereof to said slider tube, said holder support means further including a circular gear casing connected to a front end of said support tube and accommodating said main gear as well as said drive and driven gears, and said cutter holder projecting through an opening of said gear casing but has a pair of arcuate wings guided by the inner circumference of said gear casing.

14. The power tool as defined in claim 1, wherein said rotary cutter is in the form of a cord-type rotary cutter.

* * * * *